(12) United States Patent
Choi

(10) Patent No.: US 6,824,143 B2
(45) Date of Patent: Nov. 30, 2004

(54) AIR SUSPENSION SYSTEM FOR AN AUTOMOTIVE VEHICLE

(75) Inventor: Ki-Wan Choi, Kyungki-do (KR)

(73) Assignee: Hyundai Motor Company, Seoul (KR)

( * ) Notice: Subject to any disclaimer, the term of this patent is extended or adjusted under 35 U.S.C. 154(b) by 25 days.

(21) Appl. No.: 10/291,351

(22) Filed: Nov. 7, 2002

(65) Prior Publication Data
US 2003/0085535 A1 May 8, 2003

(30) Foreign Application Priority Data
Nov. 8, 2001 (KR) .......................................... 2001-69407

(51) Int. Cl.[7] .............................................. B60G 17/01
(52) U.S. Cl. .................................................. 280/5.514
(58) Field of Search ........................ 280/5.514, 5.515, 280/124.106, 124.157, 124.16, 124.159; 267/122, 123, 127, 64.27

(56) References Cited

U.S. PATENT DOCUMENTS

| | | | |
|---|---|---|---|
| 2,998,244 A | * 8/1961 | Francis | ..................... 267/64.14 |
| 4,468,050 A | * 8/1984 | Woods et al. | ............ 280/5.514 |
| 4,669,710 A | * 6/1987 | Horvat | ..................... 267/64.21 |
| 4,676,523 A | 6/1987 | Rogers | |
| 4,735,401 A | 4/1988 | Buma et al. | |
| 5,058,017 A | 10/1991 | Adachi et al. | |
| 5,871,217 A | 2/1999 | Blanz | |
| 6,203,026 B1 | 3/2001 | Jones | |

FOREIGN PATENT DOCUMENTS

| | | |
|---|---|---|
| EP | 0284736 | 2/1988 |
| EP | 0398009 | 4/1990 |
| EP | 0561394 | 3/1993 |
| EP | 0742113 | 5/1996 |
| WO | WO01/53136 | 1/2001 |

* cited by examiner

Primary Examiner—Faye M. Fleming
(74) Attorney, Agent, or Firm—Morgan Lewis & Bockius LLP

(57) ABSTRACT

An air suspension system for an automotive vehicle wherein compressed air infused into an air spring or discharged therefrom can be adjusted by a valve body and valve operating means equipped within the air spring. The valve operating means cooperates with the axle supporter that is bumped or rebounded by load transmitted from rough terrain or from carrying weight of the vehicle while the vehicle is in motion.

7 Claims, 3 Drawing Sheets

AIR SUSPENSION SYSTEM FOR AN AUTOMOTIVE VEHICLE

FIELD OF THE INVENTION

The present invention relates to an air suspension system for an automotive vehicle, and more particularly to a simplified air suspension system adapted to provide an air spring that functions as a leveling valve to control the inflow and outflow of compressed air in response to transmitted load or vibration.

BACKGROUND OF THE INVENTION

Generally, suspension systems have been developed with a view to alleviating shock transmitted from rough terrain to the vehicle body to thereby improve the safety and comfort of riding in a vehicle. One such suspension system is an air suspension system. In this system, the supply and discharge of compressed air is controlled to control the height of the vehicle in response to weight and to suppress changes in the position of the vehicle to provide stability while the vehicle is in motion.

However, prior art air suspension systems generally have a relatively large number of component parts, such as the leveling valve, a lever connected to the rocker of the leveling valve, and a rod connected to the lever and to an axle supporter mounted with the axle. Also, such air suspension systems must take into account interference between related parts of the lever, rod and correlated parts, resulting in difficulty in layout of component parts and design thereof.

SUMMARY OF THE INVENTION

The present invention provides an air suspension system for an automotive vehicle adapted to provide a leveling function within an air spring to control the inflow and outflow of compressed air in response to a load or vibration transmitted from rough terrain or from carrying weight of the vehicle while the vehicle is in motion. In accordance with one embodiment of the present invention, a valve body is mounted in an inner upper portion of a bellows. The valve body has communicating passages for supplying pressurized air into the bellows or for discharging the pressurized air out of the bellows. A piston is installed underneath the bellows. A valve operating means is provided to switch the open/closed state of the communicating passages in response to relative movement of the piston and the valve body.

In a further alternative embodiment of the present invention, an air suspension system for a vehicle preferably includes at least one air spring. In a preferred embodiment, the air spring comprises a bellows, a piston and a valve. The bellows defines a closed space and is adapted to be secured to a portion of the vehicle at an upper end thereof. The piston is disposed at a lower end of the bellows and the bellows is secured around the piston with an air-tight seal. The valve is disposed within the bellows and communicates with a source of pressurized air. The valve also cooperates with the piston to control flow of pressurized air into and out of the bellows in response to up and down motion of the piston as the vehicle moves over the terrain.

Preferably, the valve includes a valve body mounted in an upper portion of the closed space defined by the bellows. The valve body is adapted to be fixed to move with the frame of the vehicle and defines plural air passages. A first air passage provides pressurized air. A second air passage exhausts to atmosphere and leads into the closed space. The first air passage joins the second air passage at a first branch point. A third air passage joins the second air passage at a second branch point, above the first branch point, and communicates with the closed space. A linkage is received at one end in the second air passage and is operatively linked to the piston at an opposite end. A first seal is mounted on the linkage and slideably received in the second air passage to control communication between the second air passage and the closed space, thereby selectively permitting pressurized air to flow into the closed space. A second seal is mounted on the linkage above the first seal. The second seal provides selective communication between the second and third air passages in response to movement of the piston.

In further preferred embodiments, the suspension system of the present invention includes an axle support member on which a vehicle axle and wheel are mounted, with piston being secured to the axle support member. At least two air springs may be mounted on the axle support member. Also, the system may include a pressurized air tank mounted on the vehicle to provide the source of pressurized air.

BRIEF DESCRIPTION OF THE DRAWINGS

For fuller understanding of the nature and objects of the invention, reference should be made to the following detailed description taken in conjunction with the accompanying drawings in which.

DETAILED DESCRIPTION OF THE INVENTION

An embodiment of the present invention will now be described in detail with reference to the accompanying drawings.

Figure 1:
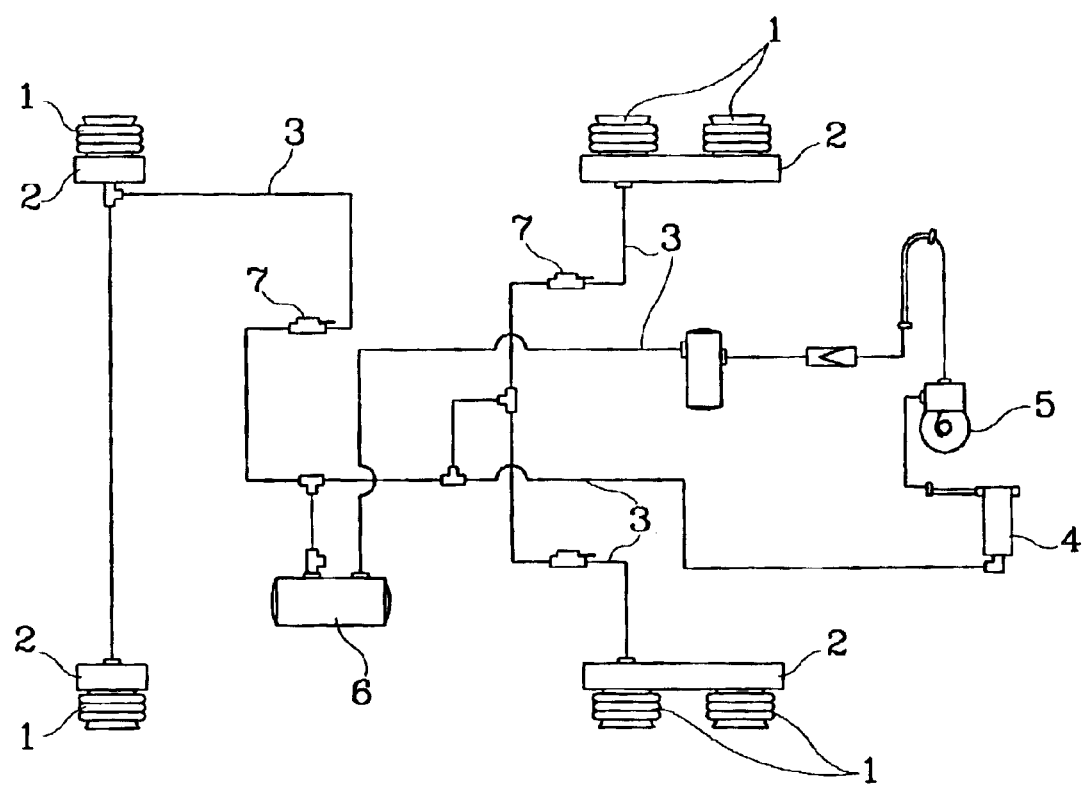
FIG. 1 is a schematic block diagram illustrating an air suspension system.

As shown in FIG. 1, air springs 1 may be independently mounted each at front/rear wheels with surge tanks 2, where each air spring 1 is connected to a pressure control valve 4 via an air flow passage 3. The pressure control valve 4 is, in return, connected to an air compressor 5 for receiving outside air to compress same in high pressure, and the air flow passage 3 is respectively mounted with an auxiliary tank 6 and a drainer 7. Other general arrangements may be devised by persons of ordinary skill in the art.

Figure 2:
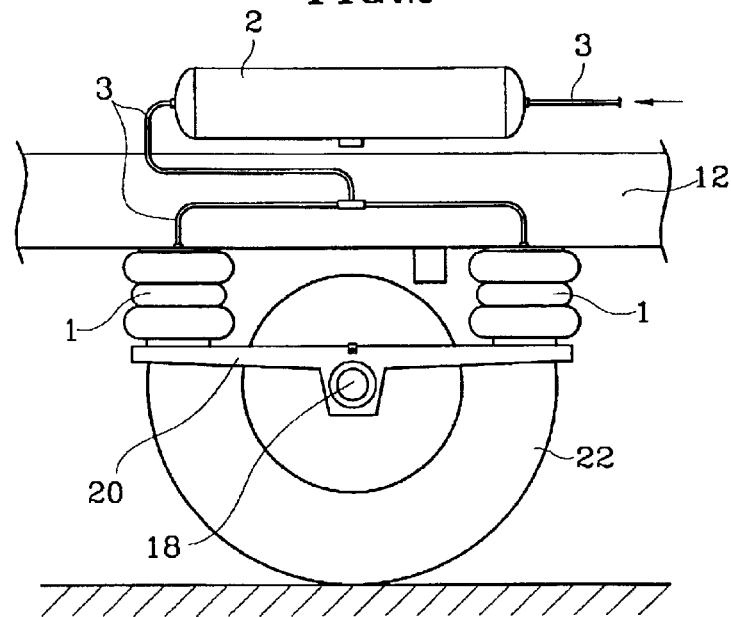
FIG. 2 is a schematic drawing illustrating an air spring for an air suspension system according to the present invention.

As illustrated in FIG. 2, air springs 1, according to an embodiment of the present invention, are mounted each at front/rear wheels between a body frame 12 and an axle supporter 20. Axle supporter 20 carries axle 18, on which tire and wheel 22 is mounted in a conventional manner. Each air spring 1 receives compressed air under high pressure stored in a surge tank 2 via air flow passage 3.

Figure 3:
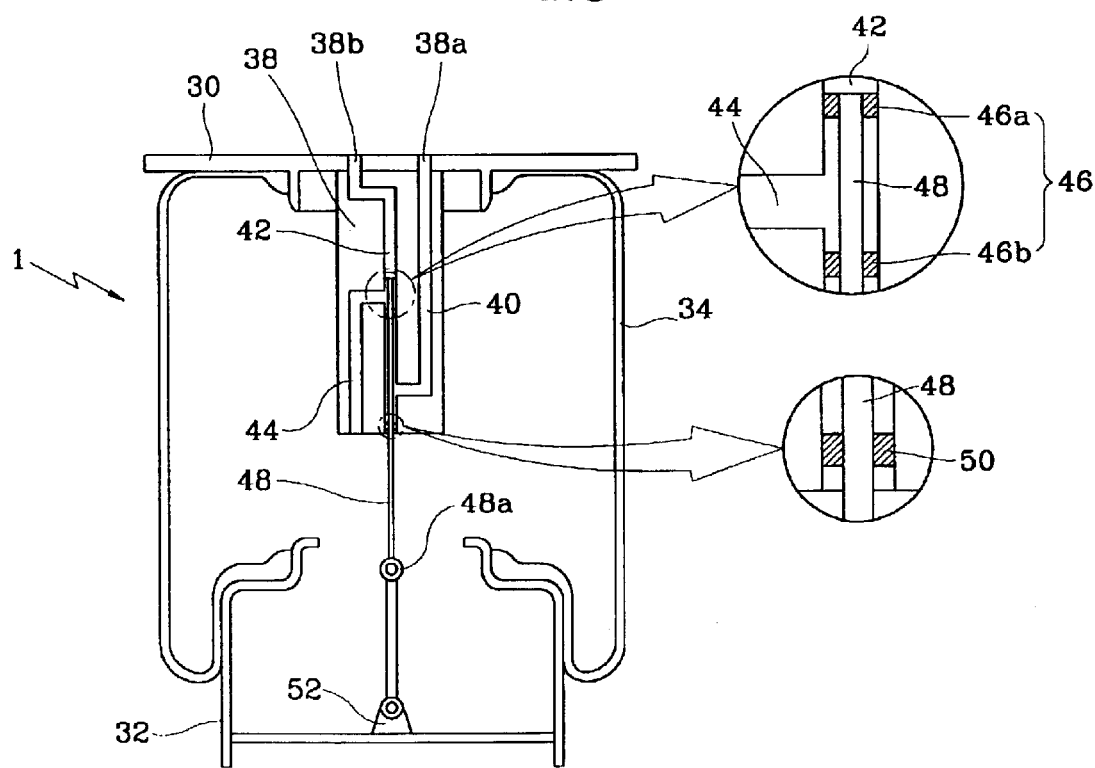
FIG. 3 is a cross-sectional view illustrating the structure of the air spring of FIG. 2.

As shown in FIG. 3, the air spring 1 includes a mounting plate 30 fixed to the body frame 12, a piston 32 fixed to the axle supporter 20, and a bellows 34 coupled at upper/lower portions thereof to the mounting plate 30 and the piston 32 with an airtight seal to form a closed space therein.

Mounted in air spring 1 is a valve body 38 and a valve operating means for controlling flow of high-pressure air from the surge tank 2 into the air spring 1 and out of the air spring 1 to the atmosphere when the axle supporter 20 vertically moves, thereby keeping a vehicular height at a proper level.

Valve body 38 is disposed underneath the mounting plate 30 at an inner upper portion of the bellows 34. Valve body 38 includes a number of parts and passages as follows: An inlet port 38a communicates with the air flow passage 3, which also communicates with the surface tank 2. An exhaust port 38b communicates with outside air. A first communicating passage 40 formed to infuse high-pressure air from the inlet port 38a into the valve body 38. A second communicating passage 42 is connected to an interior of the valve body 38 from the exhaust port 38b to communicate with the first communicating passage 40. Second communicating passage 42 is formed to allow the valve operating means to slidably be inserted thereinto. A third communicating passage 44 branches from the second communicating passage 42 at a place higher than where the second communicating passage 42 communicates with the first communicating passage 40 to thereby communicate with the interior of the bellows 34.

The valve operating means includes a connecting rod 48 slidably inserted at an upper end thereof into the second communicating passage 42 and connected at a lower end thereof to a lower portion of the piston 32. A blocking member 46, including an upper and a lower sealing unit 46a and 46b, is mounted on an upper end of the connecting rod 48. The upper and lower sealing units block the opening to the third communicating passage 44 from the second communicating passage 42 at upper and lower ranges of motion of the air spring. A sealing member 50 is mounted at an inner lower surface of the second communicating passage 42 for blocking the gap between the second communicating passage 42 and the connecting rod 48.

The connecting rod 48 is rotatably connected at a lower end thereof to a bottom surface of the piston 32 via a mounting bracket 52. A hinge 48a is provided at a midsection of rod 48 to allow an upper portion and a lower portion thereof to move angularly with respect to one another so that the blocking member 46 freely moves within the second communicating passage 42 even if the piston 32 is inclined relative to the body frame. Thus, as shown in FIG. 3, the high pressure air infused into the first communicating passage 40 via the inlet port 38a is blocked from the outside atmosphere and from the third communicating passage 44 by the blocking member 46. The high pressure air is also blocked from the closed space formed by the bellows 34 by the sealing member 50 installed at the lower end portion of the second communicating passage 42 when the air spring 1 is working under the normal state.

Figure 4:
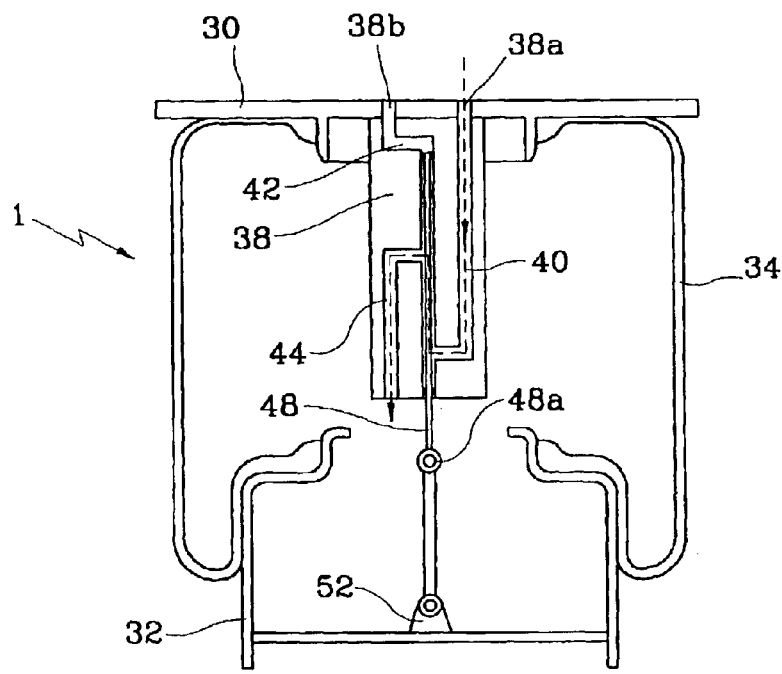
FIG. 4 is a cross-sectional view illustrating a compressed state of the air spring of FIG. 2.

When the vehicle suspension moves relative to the frame, the bellows 34 compresses due to the load applied to the mounting plate 30 as shown in FIG. 4. As a result, the blocking member 46 mounted at the upper end of the connecting rod 48 moves up within the second communicating passage 42 to allow communication between the second communicating passage 42 and the third communicating passage 44. In this state the high pressure air infused into the first communicating passage 40 through the inlet port 38a is again infused into the closed space formed by the bellows 34 via the second and third communicating passages 42 and 44 to expand the air spring 1, thereby restoring the height of the vehicle to a normal level.

Figure 5:
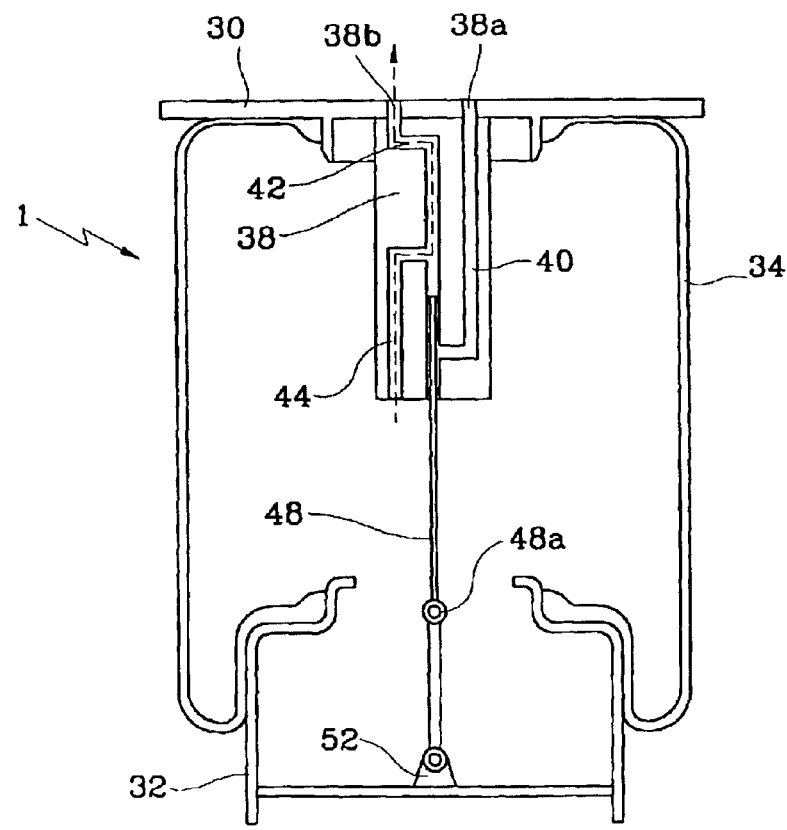
FIG. 5 is a cross-sectional view illustrating an expanded state of the air spring of FIG. 2.

When the bellows 34 is expanded due to rebound while the vehicle is in motion, the blocking member 46 moves down within the second communicating passage 42, as shown in FIG. 5. In this state the blocking member 46 allows communication between the second communicating passage 42 and the third communicating passage 44, whereby high-pressure air contained in the closed space formed by the bellows 34 passes through the third and second communicating passages 44 and 42 to be discharged out the atmosphere via the exhaust port 38b.

The blocking member 46 of the connecting rod 48 blocks a passage between the first communicating passage 40 communicating with the inlet port 38a and the third communicating passage 42, thereby shutting off the inflow of the high-pressure air into the closed space of the air spring 1. Thus, the bellows 34 is compressed, thereby enabling to restore the height of a vehicle to a normal position.

As apparent from the foregoing, there are advantages in the air suspension system for an automotive vehicle thus described according to an embodiment of the present invention. In particular, compressed air infused into the air spring 1 or discharged therefrom can be adjusted by the valve body and valve operating means mounted in the air spring 1 when the axle supporter 20 is bumped or rebounded by a load transmitted from the rough terrain and carrying weight of a vehicle while the vehicle is in motion. Another advantage is that assembly processes can be reduced due to the simplified component elements of an air suspension system, and no consideration to interference of the peripheral parts during the design of the air suspension system is necessary, thereby promoting freedom of the design process thereof.

What is claimed is:

1. An air suspension system for a vehicle, the system comprising:

a vertically expandable bellows;

a valve body mounted within an inner upper portion of the bellows and provided with communicating passages for supplying pressurized air into the bellows or for discharging the pressurized air out of the bellows;

wherein the valve body comprises an inlet port for receiving the pressurized air;

an exhaust port for communicating with atmosphere;

a first communication passage so formed to infuse high-pressure air from the inlet port into the valve body;

a second communication passage connected to an interior of the valve body from the exhaust port to communicate with the first communicating passage;

a third communicating passage branched from the second communicating passage at a place higher than a place where the second communicating passage communicates with the first communicating passage to thereby communicate with the interior of the bellows; and a valve operating means for switching an open/close state of the communicating passages in response to the relative movement of the piston and the valve body, wherein the second communicating passage is formed to allow the valve operating means to slidably be inserted therein.

2. The system as defined in claim 1, wherein the valve operating means comprises:

a connecting rod connected at a lower end thereof to a bottom surface of the piston and slidably inserted at an upper end thereof into the second communicating passage;

a blocking member comprising an upper and a lower sealing unit mounted on an upper end of the connecting rod in order to block in upper and lower directions an area where the third communicating passage and the second communicating passage are branched out when the air spring is operated in normal state; and a sealing member mounted at an inner lower surface of the second communicating passage for blocking a gap between the second communicating passage and the connecting rod.

3. The system as defined in claim 2, wherein the connecting rod is rotatably connected at a lower end thereof to a bottom surface of the piston and provided at a midsection thereof with a hinge in order to allow an upper portion and a lower portion thereof to be bent with respect to each other.

4. An air suspension system for a vehicle including at least one air spring, said air spring comprising:

a bellows defining a closed space, the bellows being adapted to be secured to a portion of the vehicle at an upper end thereof;

a piston at a lower end of said bellows, the bellows being secured around the piston with an air tight seal;

a valve disposed within the bellows and communicating with a source of pressurized air, said valve cooperating with the piston to control flow of pressurized air into and out of the bellows in response to up and down motion of the piston, wherein the valve comprises a valve body mounted in an upper portion of said closed space and adapted to be fixed to move with said vehicle portion, said valve body defining a first air passage providing pressurized air, a second air passage exhausting to atmosphere and communicating with the first air passage at a first branch point, and a third air passage joining the second air passage at a second branch point and communicating with said closed space;

a linkage received at one end in said second air passage and operatively linked to said piston at an opposite end;

a first seal mounted on the linkage and slideably received in said second air passage to selectively control flow of pressurized air from the first air passage through the second air passage to the closed space; and a second seal mounted on the linkage above the first seal to selectively control communication between said second and third air passages, said selective control by the linkage being in response to movement of the piston.

5. The air suspension system of claim 4, further comprising an axle support member on which a vehicle axle and wheel are mounted, wherein said piston is secured to the axle support member.

6. The air suspension system of claim 5, wherein at least two said air springs are mounted on the axle support member.

7. The air suspension system of claim 4, further comprising a pressurized air tank mounted on the vehicle to provide said source of pressurized air.

* * * * *